Figure 1:
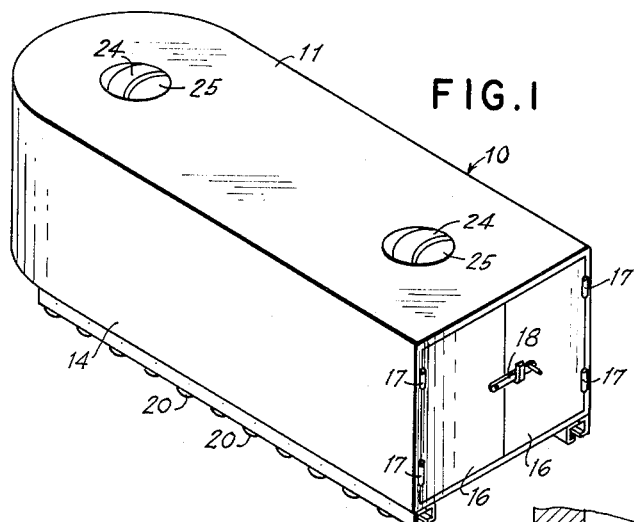

March 13, 1962     J. R. BATYR     3,025,075

MOBILE SHIPPING AND STORAGE UNIT

Filed June 23, 1959

INVENTOR.
JULES R. BATYR
BY James J. Cannon

ATTORNEY

United States Patent Office 3,025,075
Patented Mar. 13, 1962

3,025,075
MOBILE SHIPPING AND STORAGE UNIT
Jules R. Batyr, 286 MacDougal St., Brooklyn, N.Y.
Filed June 23, 1959, Ser. No. 830,445
1 Claim. (Cl. 280—79.2)

My invention relates to the transportation of cargo and is directed particularly to a shipping and storage unit for use with standard trailer trucks which allows rapid loading and unloading and therefore more efficient use of the trucks, while at the same time offering maximum protection to the cargo while in transit and storage.

Ordinarily, trailer trucks are loaded directly with the cargo or merchandise to be transported, a time consuming operation which keeps the truck out of service during its period of loading and unloading. In many cases there are additional delays in loading occasioned by the merchandise not reaching the loading dock on schedule from previous transportation systems, such as rail or boat.

It is accordingly the principal object of my invention to provide a mobile storage and shipping unit for trailer trucks which can be loaded independently of a trailer truck and ready for instant loading in the trailer truck when it arrives, thereby eliminating the usual lengthy out-of-service time during loading and allowing more efficient use of costly trailer trucks.

A more particular object of my invention is to provide a mobile storage unit of the character described which is strong, capable of being fully enclosed and locked, readily movable in any direction on its own rolling means, and of such size as to fit snugly, either as a single unit, or as a small multiple of units, into a standard trailer truck.

Another object is to provide a mobile storage unit of the character described which is strong enough and which has means for allowing it to be hoisted from a loading platform into a trailer truck, and which further comprises means for anchoring it in the trailer truck when loaded therein.

Figure 2:
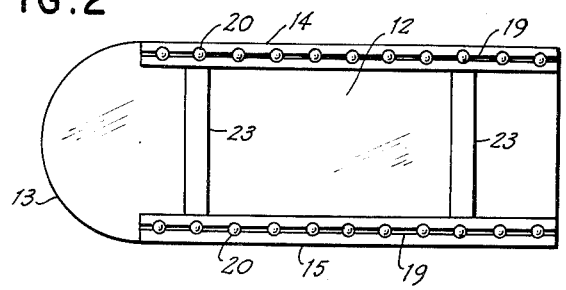
Figure 4:
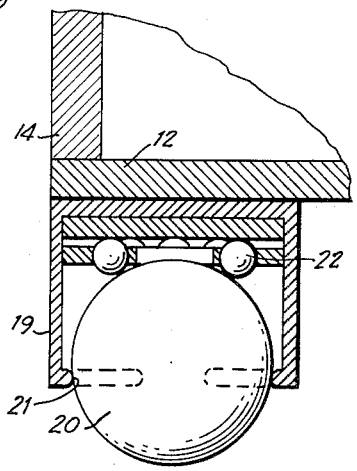
Figure 3:
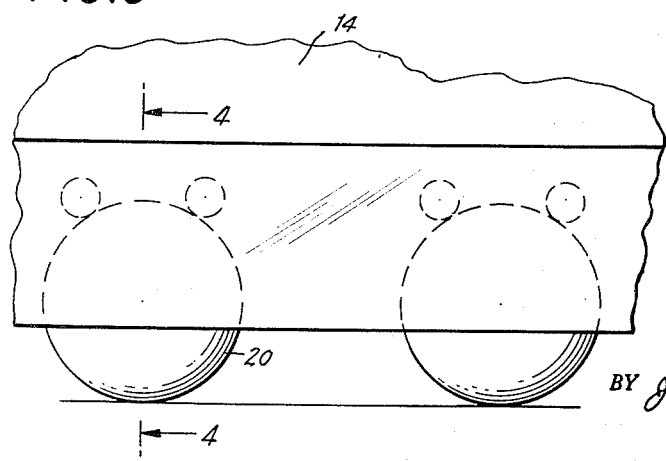

Other objects, features and advantages of my invention will be apparent from the following description when read with reference to the accompanying drawings. In the drawings, wherein like reference numerals denote corresponding parts throughout the several views:

FIG. 1 is a perspective view of a mobile shipping and storage unit embodying the invention, FIG. 2 is a bottom view thereof showing the roller bearing mobile means of the storage unit itself, FIG. 3 is a partial side elevational view of the storage unit illustrating the roller bearing mobile means on a larger scale, FIG. 4 is a vertical cross-sectional view taken along the line 4—4 of FIG. 3 in the direction of the arrows and illustrating constructional details of the roller mobile means.

Referring now in detail to the drawings, the reference numeral 10 designates generally a mobile shipping and storage unit according to the invention, the same being generally box-like in shape and rounded in front to conform closely to the internal cargo space of a standard trailer truck. The unit 10 is preferably constructed of heavy gauge stainless steel and comprises a top 11, a bottom 12, a front wall 13 and side walls 14 and 15. The rear end of the unit 10 is fitted with a pair of doors 16 hinged to the side walls 14 and 15 thereof as by hinges 17, and fitted with a latch 18 which may be locked to seal the unit when loaded and thus protect against pilferage. The doors swing open to each side to the full extent of the opening to provide ready access for loading and unloading. The height of the unit 10, being only slightly less than the height of the cargo space in a trailer truck, is enough to permit convenient loading.

Means is provided for manually moving the unit 10 from place to place in any direction. To this end the bottom 12 thereof is provided at each side with a pair of channel members 19 supporting a plurality of ball bearings 20 on which said unit rests. As illustrated in FIG. 4, the ball bearings 20 project through openings 21 in the channel members 19, of lesser diameter than the diameter of said ball bearings for retaining them in place. Anti-friction thrust bearing means in the form of a ball bearing ring 22 is provided in the channel members 19 above each of the ball bearings 20. It will thus be apparent that the unit 10, even when heavily loaded, can be moved from place to place by itself readily when not in transit in a trailer truck. The channel members 19, furthermore, serve to strengthen the unit 10 and, together with the transverse brace channels 23 fixed against the bottom 12 of said unit between the channel members 19, provide a rigid base structure for the unit 10.

In order to facilitate loading the unit 10 into a trailer truck when ramp or dock means for rolling it in are not available, or when loading the unit in the hold of a ship or on flatcars for rail shipment, a pair of hook rings 24 are provided near each end of the top 11 of said unit in recesses 25.

It will be apparent that one advantage of mobile shipping and storage units embodying my invention is that their use will eliminate the costly time a trucker wastes in the waiting for his trailer to be loaded. In some cases where the cargo items are not packaged it takes three to four hours to complete the loading before a driver can be on his way. If the customer of the trucker orders a "mobile unit" in advance of the shipping date, it could be loaded and waiting on the platform for the trailer to arrive. One very important factor is that the trucker can still have the use of a complete trailer to handle other business. Should the case be that the future delivery is two or three weeks away, just one trailer is needed, which gives the trucker a double-barrelled service. This particular service can be worked in many useful ways to the trucker's advantage costwise when you take the time a trailer leaves one point, picks up a loaded "mobile unit" on a moment's notice and be on his way with it in a matter of minutes. The trucker can deliver to several customers weeks in advance of expected deliveries and with the same trailer trucks can go on with other business in the regular way, which is many cases may not be full loads to one point, but split deliveries to several points.

Another advantage is that my invention can very easily be applied to rail transportation such as the "piggy back" system now in use on several lines. Thus, the "mobile unit" could be loaded on a flatcar and the trucker would still have a complete trailer at his disposal to take on a standard load.

Another advantage is that the same method can be applied to sea transportation. In systems presently in use, the entire trailers are loaded on deck and in special holds, the trailer being lifted on with the use of a crane. The "mobile unit," according to my invention, however, can be moved directly onto the ship with the use of a ramp and once on board the fork lift truck would move it into position.

Another important advantage of my invention is that with the design of today's trailers being close to standard the "mobile unit" can be loaded and unloaded several times from truck to rail and again to truck and truck without the merchandise being removed, which cuts down on theft and damage, which run high with methods now in use.

Still another advantage of my mobile unit is its use for storage for any period of time. From household every-day items that are often stored to war materials that are now stored loose and would take many time-consuming hours to load, the "mobile unit" can be stored and when needed moved on a moment's notice. This particular use is important since it cuts down by 50% the number of times a stored item need be handled.

While I have illustrated and described herein one form in which the invention may conveniently be embodied in practice, it is to be understood that this embodiment is presented by way of example only, and not in a limiting sense. In short, the invention includes all the modications and embodiments coming within the scope of the following claim:

What I claim as new and desire to secure by Letters Patent is:

A mobile shipping and storage unit structure comprising a bottom wall, a top wall, side walls interconnecting said top and bottom walls, a front wall interconnecting said top, bottom and side walls, doors at the rear end of said structure, a longitudinally extending channel member affixed to the underside of the bottom wall adjacent each side thereof, said channel members each having a series of longitudinally spaced openings in the underside thereof, a ball bearing partially extending through each of said openings, a thrust bearing ring mounted in each of said channels above and in contact with each of said ball bearings, and transversely extending brace members interconnecting said channel members, said interconnected channel members and brace members constituting an assembly strengthening rigid base for said box-like structure.

References Cited in the file of this patent

UNITED STATES PATENTS

| | | |
|---|---|---|
| 1,648,301 | Fitch | Nov. 8, 1927 |
| 1,670,880 | Davis | May 22, 1928 |
| 1,783,363 | Grob | Dec. 2, 1930 |
| 1,784,975 | Rosman | Dec. 16, 1930 |
| 1,900,867 | Olds | Mar. 7, 1933 |
| 2,172,154 | Perin | Sept. 5, 1939 |
| 2,498,906 | Apperson | Feb. 28, 1950 |
| 2,620,079 | Rosenbaum | Dec. 2, 1952 |
| 2,715,971 | Cox | Aug. 23, 1955 |
| 2,876,016 | McClellan | Mar. 3, 1959 |